(12) United States Patent
Dris et al.

(10) Patent No.: US 6,893,700 B2
(45) Date of Patent: May 17, 2005

(54) STORAGE MEDIUM FOR DATA WITH IMPROVED DIMENSIONAL STABILITY

(75) Inventors: Irene Dris, Clifton Park, NY (US); Grant Hay, Niskayuna, NY (US); Steven Frederick Hubbard, West Sand Lake, NY (US); Hendrik Theodorus Van De Grampel, Boz (NL); Geert Boven, Steenbergen (NL)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/417,718

(22) Filed: Apr. 17, 2003

(65) Prior Publication Data

US 2003/0198774 A1 Oct. 23, 2003

Related U.S. Application Data

(63) Continuation of application No. 09/683,500, filed on Jan. 9, 2002, now Pat. No. 6,716,505.
(60) Provisional application No. 60/316,534, filed on Aug. 31, 2001.

(51) Int. Cl.[7] ............................................. B32B 3/02
(52) U.S. Cl. ................ 428/64.1; 428/64.4; 430/270.11
(58) Field of Search ............................. 428/64.1, 64.4, 428/457, 913; 430/270.11, 495.1, 945; 369/283, 288

(56) References Cited

U.S. PATENT DOCUMENTS

| | | | |
|---|---|---|---|
| 4,441,179 A | 4/1984 | Slaten | |
| 4,680,211 A | 7/1987 | Evans et al. | |
| 5,586,110 A | 12/1996 | Nakaki | |
| 6,042,919 A | * | 3/2000 | Gorsuch ............. 428/64.1 |

FOREIGN PATENT DOCUMENTS

| | | |
|---|---|---|
| EP | 0 691 361 | 1/1996 |
| EP | 1 031 972 | 8/2000 |
| JP | 62290734 | 12/1987 |
| JP | 03281220 | 12/1991 |
| JP | 04321950 | 11/1992 |
| JP | 09035330 | 2/1997 |
| JP | 09054982 | 2/1997 |
| JP | 2001067726 | 3/2001 |
| WO | WO 98/20555 | 5/1998 |

OTHER PUBLICATIONS

Provisional Application No. 60/316,534, filed Aug. 31, 2001, entitled Storage Medium For Data.

"Modeling for Suppression of Moisture/Temperature Induced Dimensional Changes in Unbalanced Fibrous Composite Structures With Perfect Bonding", Yiping Qiu et al., Textile Res. J., vol. 68(1), pp. 1–9, 1998.

* cited by examiner

Primary Examiner—Elizabeth Mulvaney
(74) Attorney, Agent, or Firm—Andrew J. Caruso; Patrick K. Patnode

(57) ABSTRACT

This disclosure relates to a data storage medium, and in particular to a data storage medium comprising at least one high modulus layer used to control the overall degree of flatness in the storage medium.

19 Claims, 2 Drawing Sheets

STORAGE MEDIUM FOR DATA WITH IMPROVED DIMENSIONAL STABILITY

CROSS REFERENCE TO RELATED APPLICATIONS

This application is a continuation of application Ser. No. 09/683,500, filed Jan. 9, 2002, now U.S. Pat. No. 6,716,505 which is hereby incorporated by reference in its entirety.

This application claims priority to and the benefit of the filing date of U.S. Provisional application No. 60/316,534, filed Aug. 31, 2001 and entitled STORAGE MEDIUM FOR DATA.

BACKGROUND OF INVENTION

This disclosure relates to a data storage medium, and in particular to a data storage medium comprising at least one high modulus layer used to control the overall degree of flatness in the storage medium.

An increase in data storage density in optical data storage media is desired to improve data storage technologies, such as, but not limited to, read-only media, write-once media, rewritable media, digital versatile media and magneto-optical (MO) media.

As data storage densities are increased in optical data storage media to accommodate newer technologies, such as, but not limited to, digital versatile disks (DVD) and higher density data disks for short and long term data archives such as digital video recorders (DVR), the design requirements for the transparent component of the optical data storage devices have become increasingly stringent. Optical disks with progressively shorter reading and writing wavelengths have been the object of intense efforts in the field of optical data storage devices. Materials and methods for optimizing physical properties of data storage devices are constantly being sought. Design requirements for the material used in optical data storage media include, but are not limited to, disk flatness (e.g., tilt), water strain, low birefringence, high transparency, heat resistance, ductility, high purity, and medium homogeneity (e.g., particulate concentration). Currently employed materials are found to be lacking in one or more of these characteristics, and new materials are required in order to achieve higher data storage densities in optical data storage media. Disk flatness, also referred to as tilt, is a critical property needed for high data storage density applications. Consequently, a long felt yet unsatisfied need exists for data storage media having improved dimensional stability and minimal tilt.

SUMMARY OF INVENTION

In one embodiment, the present disclosure is drawn to an asymmetric optical storage medium comprising a layer, which improves dimensional stability in said medium, wherein the asymmetric optical storage medium comprises at least one substrate layer, at least one data layer, at least one high modulus layer, and at least one thin film layer.

In another embodiment, the present application is drawn to a method for decreasing the tilt of an asymmetric optical storage medium, said method comprising an addition step wherein a high modulus layer is added to an optical storage medium so that the directional stability of said medium is increased.

BRIEF DESCRIPTION OF DRAWINGS

Various features, aspects, and advantages of the present disclosure will become apparent with reference to the following detailed description, appended claims, and accompanying figures.

DETAILED DESCRIPTION

Figure 1:
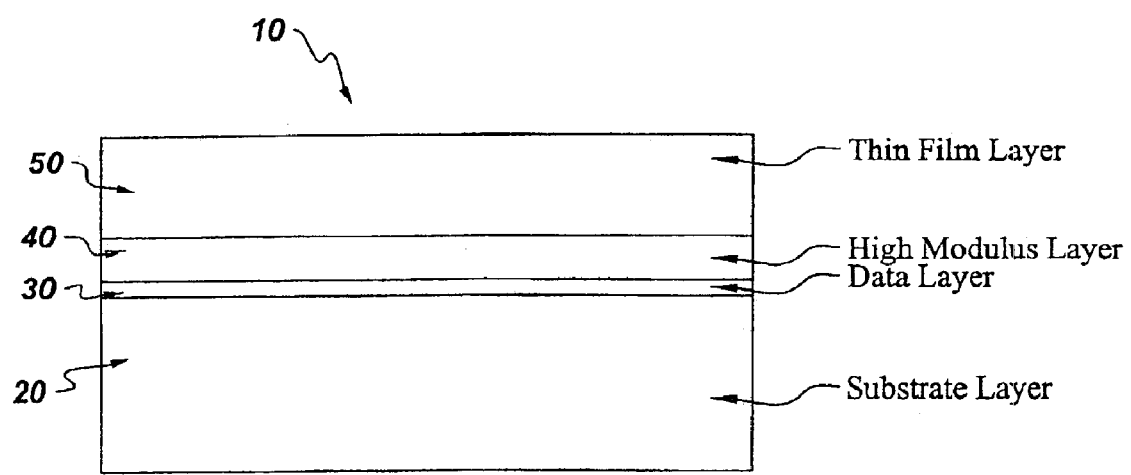
FIG. 1 is a cross sectional view of one embodiment of the present data storage medium (10), wherein the medium comprises a substrate layer (20), which is in direct contact with a data layer (30), a data layer (30), which is in direct contact with a high modulus layer (40), and a high modulus layer (40), which is in direct contact with a thin film layer (50).

The present disclosure describes the use of polymeric material as storage media for data. In one embodiment of the present disclosure, the storage medium for data (part 10 in FIG. 1; part 60 in FIG. 2) comprises a plurality of layers comprising at least one substrate layer, at least one data layer that is in direct contact with the substrate layer, at least high modulus layer, and at least one thin film layer. As used herein, the term "high modulus" refers to a tensile modulus typically greater than about 1 Gigapascal (Gpa). The high modulus layer effectively increases the dimensional stability of the data storage medium by reducing the tilt of the data storage medium. As used herein, the term "tilt" refers to the number of radial degrees by which a data storage medium bends on a horizontal axis, and is typically measured as the vertical deviation at the outer radius of the storage medium. Typically, the tilt is half of the average radial deviation (the deviation of a laser beam) as measured in degrees.

In the context of the present disclosure, a typical data storage medium is composed of a plurality of polymeric components, which are generally combined in overlaying horizontal layers of various thicknesses, depending on the specific properties and requirements of the data storage medium. A major component of a data storage medium is a substrate layer (part 20 in FIG. 1; part 70 in FIG. 2). The substrate layer is typically made of a polymeric material, which comprises at least one member selected from the group consisting of a thermoplastic, a thermoset, and any combination thereof. Both addition and condensation polymers are suitable for the present invention. As used herein the term "thermoplastic polymer", also referred to in the art as a thermoplastic resin, is defined as a material with a macromolecular structure that will repeatedly soften when heated and harden when cooled. Illustrative classes of thermoplastic polymers include, but are not limited to, styrene, acrylics, polyethylenes, vinyls, nylons, and fluorocarbons. As used herein the term "thermoset polymer", also referred to in the art as a thermoset resin, is defined as a material which solidifies when first heated under pressure, and which cannot be remelted or remolded without destroying its original characteristics. Illustrative classes of thermoset polymers included, but are not limited to, epoxides, malamines, phenolics, and ureas.

Illustrative examples of thermoplastic polymers which are suitable for the substrate layer include, but are not limited to, olefin-derived polymers (e.g., polyethylene, polypropylene, and their copolymers), polymethylpentane; diene-derived polymers (e.g., polybutadiene, polyisoprene, and their copolymers), polymers of unsaturated carboxylic acids and their functional derivatives (e.g., acrylic polymers such as poly(alkyl acrylates), poly(alkyl methacrylates), polyacrylamides, polyacrylonitrile and polyacrylic acid), alkenylaromatic polymers (e.g., polystyrene, poly-alpha-methylstyrene, polyvinyltoluene, and rubber-modified polystyrenes), polyamides (e.g., nylon-6, nylon-6,6, nylon-1,1, and nylon-1,2), polyesters; polycarbonates; polyester carbonates; polyethers such as polyarylene ethers, polyethersulfones, polyetherketones, polyetheretherketones, polyetherimides; polyarylene sulfides, polysulfones, polysulfidesulfones; and liquid crystalline polymers. In one embodiment, the substrate layer comprises a thermoplastic polyester. Suitable examples of thermoplastic polyesters include, but are not limited to, poly(ethylene terephthalate), poly(1,4-butylene terephthalate), poly(1,3-propylene terephthalate), poly(cyclohexanedimethanol terephthalate), poly (cyclohexanedimethanol-co-ethylene terephthalate), poly(ethylene naphthalate), poly(butylene naphthalate), and polyarylates.

In another embodiment the substrate layer comprises a thermoplastic elastomeric polyesters (TPE's). As defined herein, a thermoplastic elastomer is a material that can be processed as a thermoplastic material, but which also possesses some of the properties of a conventional thermoset resin. Suitable examples of thermoplastic elastomeric polyesters include, but are not limited to, polyetheresters, poly (alkylene terephthalate), poly[ethylene terephthalate], poly [butylene terephthalate]), polyetheresters containing soft-block segments of poly (alkylene oxide) particularly segments of poly(ethylene oxide) and poly(butylene oxide), polyesteramides such as those synthesized by the condensation of an aromatic diisocyanate with dicarboxylic acids, and any polyester with a carboxylic acid terminal group.

Optionally, the substrate layer can further comprise at least one dielectric layer, at least one insulating layer, or any combinations thereof. The dielectric layer(s), which are often employed as heat controllers, typically have a thickness between about 200 Å and about 1,000 Å. Suitable dielectric layers include, but are not limited to, a nitride layer (e.g., silicone nitride, aluminum nitride), an oxide layer (e.g. aluminum oxide), a carbide layer (e.g., silicon carbide), and any combinations comprising at least one of the foregoing and any compatible material that is not reactive with the surrounding layers.

Figure 2:
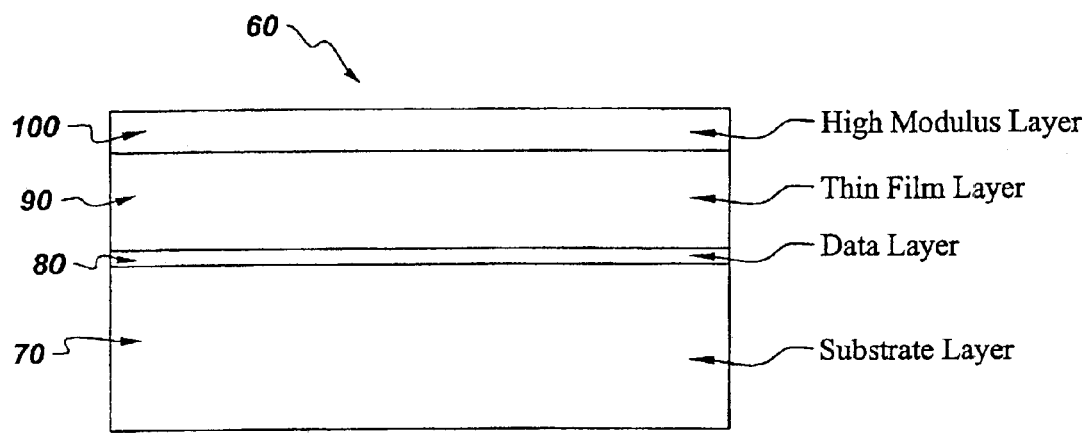
FIG. 2 is a cross sectional view of another embodiment of the present data storage medium (60), wherein the medium comprises a substrate layer (70), which in direct contact with a data layer (80), a data layer (80), which is in direct contact with a thin film layer (90), and a thin film layer (90), which is in direct contact with a high modulus layer (100).

In the context of the present disclosure, a typical data storage medium further comprises at least one data layer (part 30 in FIG. 1; part 80 in FIG. 2). The data layer, which typically comprises a reflective metal layer, can be made of any material capable of storing retrievable data, such as an optical layer, a magnetic layer, a magneto-optic layer. The thickness of a typical data layer can be up to about 600 Angstroms (Å). In one embodiment, the thickness of the data layer is up to about 300 Å. The information which is to be stored on the data storage medium can be imprinted directly onto the surface of the data layer, or stored in a photo-, thermal-, or magnetically-definable medium which has been deposited onto the surface of the substrate layer. Suitable data storage layers are typically composed of at least one material selected from the group consisting of, but are not limited to, oxides (e.g., silicone oxide), rare earth element-transition metal alloys, nickel, cobalt, chromium, tantalum, platinum, terbium, gadolinium, iron, boron, organic dyes (e.g., cyanine or phthalocyanine type dyes), inorganic phase change compounds (e.g., TeSeSn or InAgSb), and any alloys or combinations comprising at least one of the foregoing.

The reflective metal layer(s) should be of a thickness that is sufficient to reflect an amount of energy, which is sufficient to enable data retrieval. Typically, a reflective layer has a thickness up to about 700 Å. In one embodiment the thickness of the reflective layer is in between about 300 Å and about 600 Å. Suitable reflective layers include, but are not limited to, aluminum, silver, gold, titanium, and alloys and mixtures comprising at least one of the foregoing. In addition to the data storage layer(s), dielectric layer(s), protective layer(s), and reflective layer(s), other layers can be employed such as lubrication layer(s), adhesive layer(s) and others. Suitable lubricant layers include, but are not limited to, fluoro compounds such as fluoro oils and greases.

In the context of the present disclosure, a typical data storage medium further comprises at least one high modulus layer (part 40 in FIG. 1; part 100 in FIG. 2). In one embodiment of the present disclosure, a suitable high modulus layer typically comprises a thermoset polymer, which can be cured thermally, cured by ultraviolet (UV) radiation, or cured by any method commonly known to those skilled in the art. In another embodiment of the present disclosure, the high modulus layer comprises a thermoplastic polymer. In yet another embodiment of the present disclosure, the high modulus layer comprises a combination of a thermoset polymer and a thermoplastic polymer. Typically, the high modulus layer is applied to the storage medium via a spin-coating process, however, any method known to those skilled in the art such as, but not limited to, spray deposition, sputtering, and plasma deposition can be used to deposit a high modulus layer with a thickness in a range between about 0.5 micron and about 30 microns onto the data storage medium. Illustrative examples of thermoset polymers include, but are not limited to, polymers derived from silicones, polyphenelene ethers, epoxys, cyanate esters, unsaturated polyesters, multifunctional allylic materials, diallylphthalate, acrylics, alkyds, phenol-formaldehyde, novolacs, resoles, bismaleimides, melamine-formaldehyde, urea-formaldehyde, benzocyclobutanes, hydroxymethyl-furans, isocyanates, and any combinations thereof. In one embodiment, the thermoset polymer further comprises at least one thermoplastic polymer, such as, but not limited to, polyphenylene ether, polyphenylene sulfide, polysulfone, polyetherimide, or polyester. Typically, the high modulus layer is a copolycarbonate ester. The thermoplastic polymer is typically combined with a thermoset monomer mixture before curing of said thermoset. In addition the high modulus layer may be added during the lamination process of the pressure sensitive adhesive.

Currently, the dimensions of the storage medium are specified by the industry to enable their use in presently available data storage medium reading and writing devices. The data storage medium typically has an inner diameter in a range between about 15 mm and about 40 mm and an outer diameter in a range between about 65 mm and about 130 mm, a substrate thickness in a range between about 0.4 mm and about 2.5 mm with a thickness up to about 1.2 mm typically preferred. Other diameters and thickness may be employed to obtain a stiffer architecture if necessary.

The storage medium described herein can be employed in conventional optic, magneto-optic, and magnetic systems, as well as in advanced systems requiring higher quality storage medium, areal density, or any combinations thereof. During use, the storage medium is disposed in relation to a read/write device such that energy (for instance, magnetic, light, electric, or any combination thereof) is in contact with the data layer, in the form of an energy field incident on the data storage medium. The energy field contacts the data layer(s) disposed on the storage medium. The energy field causes a physical or chemical change in the storage medium so as to record the incidence of the energy at that point on a data layer. For example, an incident magnetic field might change the orientation of magnetic domains within a data layer or an incident light beam could cause a phase transformation where the light heats the point of contact on a data layer.

Numerous methods may be employed to produce the storage medium including, but not limited to, injection molding, foaming processes, sputtering, plasma vapor deposition, vacuum deposition, electrodeposition, spin coating, spray coating, meniscus coating, data stamping, embossing, surface polishing, fixturing, laminating, rotary molding, two shot molding, coinjection, over-molding of film, microcellular molding, and combinations thereof. In one embodiment, the technique employed enables in situ production of the substrate having the desired features, for example, pits and grooves. One such process comprises an injection molding-compression technique where a mold is filled with a molten polymer as defined herein. The mold may contain a preform or insert. The polymer system is cooled and, while still in at least partially molten state, compressed to imprint the desired surface features, for example, pits and grooves, arranged in spiral concentric or other orientation, onto the desired portions of the substrate, i.e., one or both sides in the desired areas. The substrate is then cooled to room temperature.

The following examples are included to provide additional guidance to those skilled in the art in practicing the claimed invention. The examples provided are merely representative of the present disclosure. Accordingly, the following examples are not intended to limit the invention, as defined in the appended claims, in any manner.

EXAMPLES

Circular data storage disks were prepared as follows. A substrate layer of 4,4'-isopropylidenediphenol-polycarbonate polymer (BPA-PC) was molded into circular disks about 1.1 mm thick, and with an inner radius of about 15 mm and an outer radius of about 120 mm. A metallic data layer, of about 500 Angstroms thick, was sputtered to one of the surfaces of the BPA-PC substrate disks. Various thicknesses, described in table 1, of an acrylic lacquer layer (Daicure SD-698) were spin coated onto the metallic data layer of the disks, and the lacquer was cured using UV radiation. A co-polycarbonate-ester thin film of about 75 micron thickness, was bonded to the acrylic layer of the disks using a 25 micron thickness pressure sensitive adhesive of negligible modulus, to yield circular data storage disks with a layer configuration similar to that disclosed in FIG. 2. The data storage disks were equilibrated in an environment of an humidity of about 50%. The data storage disks were then transferred from this first environment of an initial humidity of about 50%, to a second environment with humidity of about 90%. The tilt of the data storage disks was measured over time at a radius of 55 mm while the disk equilibrated in the 90% humidity. The results of the maximum radial tilt measured over the dynamic as the disks re-equilibrated to the 90% humidity environment for the data storage disks with varying thickness of the spin-coated high modulus layer are described in table 1.

TABLE 1

| High Modulus Lacquer thickness (microns) | Maximum Radial tilt at 55 mm (degrees) |
| --- | --- |
| 0 | 0.316 |
| 6.6 | 0.196 |
| 14.6 | 0.127 |
| 27.1 | −0.171 |

As disclosed by the results in table 1, the addition of the high modulus lacquer layer to the data storage disks reduces the radial tilt of the disks during the dynamic period during which the data storage disks are equilibrating from the first to the second humidity level.

While the invention has been illustrated and described, it is not intended to be limited to the details shown, since various modifications and substitutions can be made without departing in any way from the spirit of the present disclosure. As such, further modifications and equivalents of the invention herein disclosed can occur to persons skilled in the art using no more than routine experimentation, and all such modifications and equivalents are believed to be within the spirit and scope of the disclosure as defined by the following claims.

What is claimed is:

1. An asymmetric optical storage medium comprising a plurality of layers, said plurality of layers including a substrate layer, a data layer, and at least one high modulus layer which improves dimensional stability in said medium, said high modulus layer comprising a cured high modulus organic polymer having a tensile modulus of at least 1 gigapascal.

2. The optical storage medium of claim 1, wherein said high modulus layer comprises a material cured using ultraviolet light.

3. The optical storage medium of claim 2, wherein said material comprises at least one member selected from the group consisting of an acrylate, an epoxy, a silicone-acrylate, a urethane, and any combination thereof.

4. The optical storage medium of claim 1, wherein said high modulus layer comprises a thermally cured material.

5. The optical storage medium of claim 4, wherein said material comprises at least one member selected from the group consisting of a silicone hardcoat, silica with hydrolizable silanes, an epoxy, a urethane, an imide, a siloxane and any combination thereof.

6. The optical storage medium of claim 3, wherein said acrylate is at least one member selected from the group consisting of a poly-methylmethacrylate, a methyl methacrylate-polyimide copolymer, a methyl methacrylate-silicone copolymer, and any combination thereof.

7. The optical storage medium of claim 1, wherein said high modulus layer is in direct contact with a data layer.

8. The optical storage medium of claim 1, wherein said high modulus layer is in direct contact with a film layer.

9. The optical storage medium of claim 1, wherein the thickness of said high modulus layer is between about 0.01 micrometers ($\mu$m) and about 50 micrometers ($\mu$m).

10. The optical storage medium of claim 1, wherein said high modulus layer has a modulus that is greater or equal to the modulus of the substrate layer.

11. An asymmetric optical storage medium comprising the following layers:

at least one substrate layer;

at least one data layer which is in direct contact with said substrate layer;

at least one high modulus layer which in direct contact with said data layer, said high modulus layer comprising a cured high modulus organic polymer having a tensile modulus of at least 1 gigapascal; and at least one thin film layer which is in direct contact with said high modulus layer.

12. The optical storage medium of claim 11, wherein said substrate layer is a polymeric material comprising at least one member selected from the group consisting of a thermoplastic, a thermoset, and any combination thereof.

13. The optical storage medium of claim 12, wherein said thermoplastic is one member selected from the group consisting of a polyester, a polycarbonate, a polystyrene, a polymethylmethacrylate, a polyketone, a polyamide, an aromatic polyether, a polyether-sulfone, a polyether-imide, a polyether ketone, a polyphenylene ether, a polyphenylene sulfide, and any combinations thereof.

14. The optical storage medium of claim 11, wherein said data layer comprises at least one member selected from the group consisting of a thermoplastic, a thermoset, and any combination thereof.

15. The optical storage medium of claim 11, wherein said high modulus layer further comprises at least one member selected from the group consisting of a thermoplastic, a thermoset, and any combination thereof.

16. The optical storage medium of claim 11, wherein said thin film layer comprises at least one member selected from the group consisting of a homopolymer, a copolymer, a thermoplastic, a thermoset, and any mixtures thereof.

17. The optical storage medium of claim 16, wherein said thermoset is spin coated.

18. A method for decreasing the tilt of an asymmetric optical storage medium, said method comprising an addition step wherein a high modulus layer is added to the optical storage medium so that the dimensional stability of said medium is increased, said high modulus layer comprising a cured high modulus organic polymer having a tensile modulus of at least 1 gigapascal.

19. The method of claim 18, wherein said optical storage medium comprises:

at least one substrate layer;

at least one data layer which is in direct contact with said substrate layer;

at least one high modulus layer which in direct contact with said data layer, and at least one thin film layer which is in direct contact with said high modulus layer.

* * * * *